Figure 12:
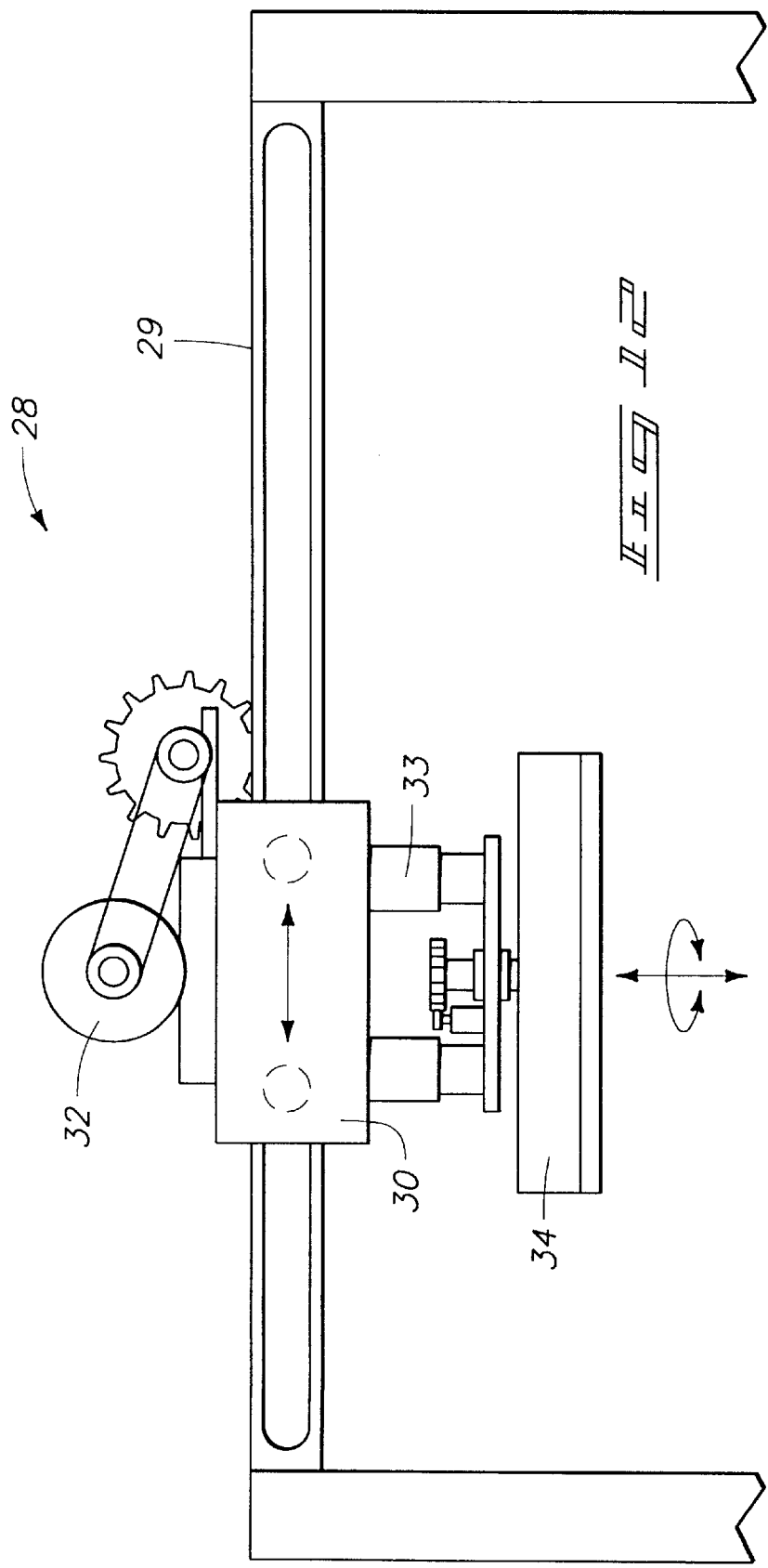

United States Patent [19]
Corrales

[11] Patent Number: 5,967,292
[45] Date of Patent: Oct. 19, 1999

[54] BUNDLE POSITIONING DEVICE

[75] Inventor: Steve Corrales, Spokane, Wash.

[73] Assignee: Thermoguard Equipment, Inc., Spokane, Wash.

[21] Appl. No.: 09/052,275

[22] Filed: Mar. 30, 1998

[51] Int. Cl.⁶ .................................................. B65G 47/24
[52] U.S. Cl. ..................... 198/411; 198/379; 198/457.07; 198/597
[58] Field of Search ................................. 198/379, 411, 198/412, 414, 597, 457.07

[56] References Cited

U.S. PATENT DOCUMENTS

| | | | |
|---|---|---|---|
| Re. 35,066 | 10/1995 | Martin | 414/799 |
| 3,164,080 | 1/1965 | Miller, Jr. | 414/793.4 |
| 3,245,557 | 4/1966 | Maramonte et al. | 414/793.4 |
| 3,587,876 | 6/1971 | Dahlem et al. | 198/411 |
| 3,608,746 | 9/1971 | Meyer | 414/789.6 |
| 3,939,993 | 2/1976 | Lingl, Jr. | 198/379 |
| 4,155,467 | 5/1979 | Lingl | 414/41 |
| 4,271,755 | 6/1981 | Kintgen et al. | 414/793.4 |
| 4,299,076 | 11/1981 | Humphrey | 198/412 |
| 4,591,046 | 5/1986 | Toste, Jr. et al. | 198/457.07 |
| 5,181,598 | 1/1993 | Lashyro et al. | 198/377 |
| 5,540,545 | 7/1996 | Roberts et al. | 414/792.6 |
| 5,575,468 | 11/1996 | Bell | 198/412 |

FOREIGN PATENT DOCUMENTS 23 12 823  9/1973  Germany.
36 14 202  10/1987  Germany.

OTHER PUBLICATIONS

J. W. Greer Company brochure "The Palletizer," 1955.
PCT International Search Report, PCT/US98/13679, Jun. 30, 1998, with attached references: DE3614202 A; DE 2312823A; U.S. Pat. No. 5,181,598.

Primary Examiner—William E. Terrell
Assistant Examiner—Khoi H. Tran
Attorney, Agent, or Firm—Wells, St. John, Roberts, Gregory & Matkin P.S.

[57] ABSTRACT

A device and process is described for positioning a bundle having a top surface and a bottom surface. The device includes a low friction surface positioned to support the bundle fed along an infeed path to a first position along the bottom surface for free movement in a prescribed plane. A carriage assembly is adjacent the low friction surface and includes a bundle engaging foot configured for selective movement along an axis substantially normal to the low friction surface to engage the top surface of the bundle and press the bundle against the low friction surface. The carriage assembly and bundle engaging foot are configured to selectively rotate and move the bundle at the feed rate along the plane of the low friction surface to a position spaced from the first position for movement along a discharge path. In the process, the bundle is moved at the infeed rate from the infeed path to a discharge path while the bundle is selectively rotated about an axis to a selected orientation.

12 Claims, 7 Drawing Sheets

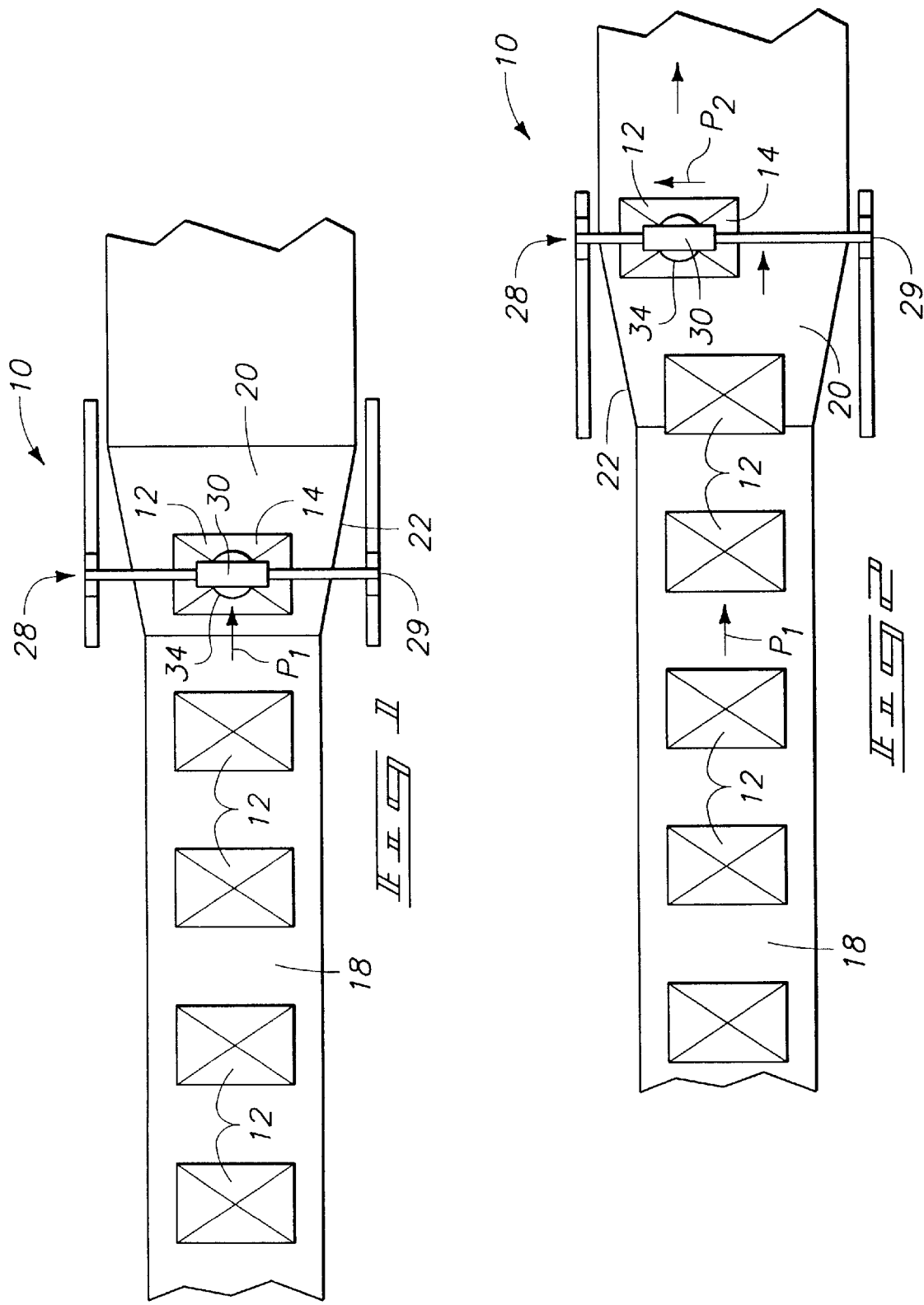

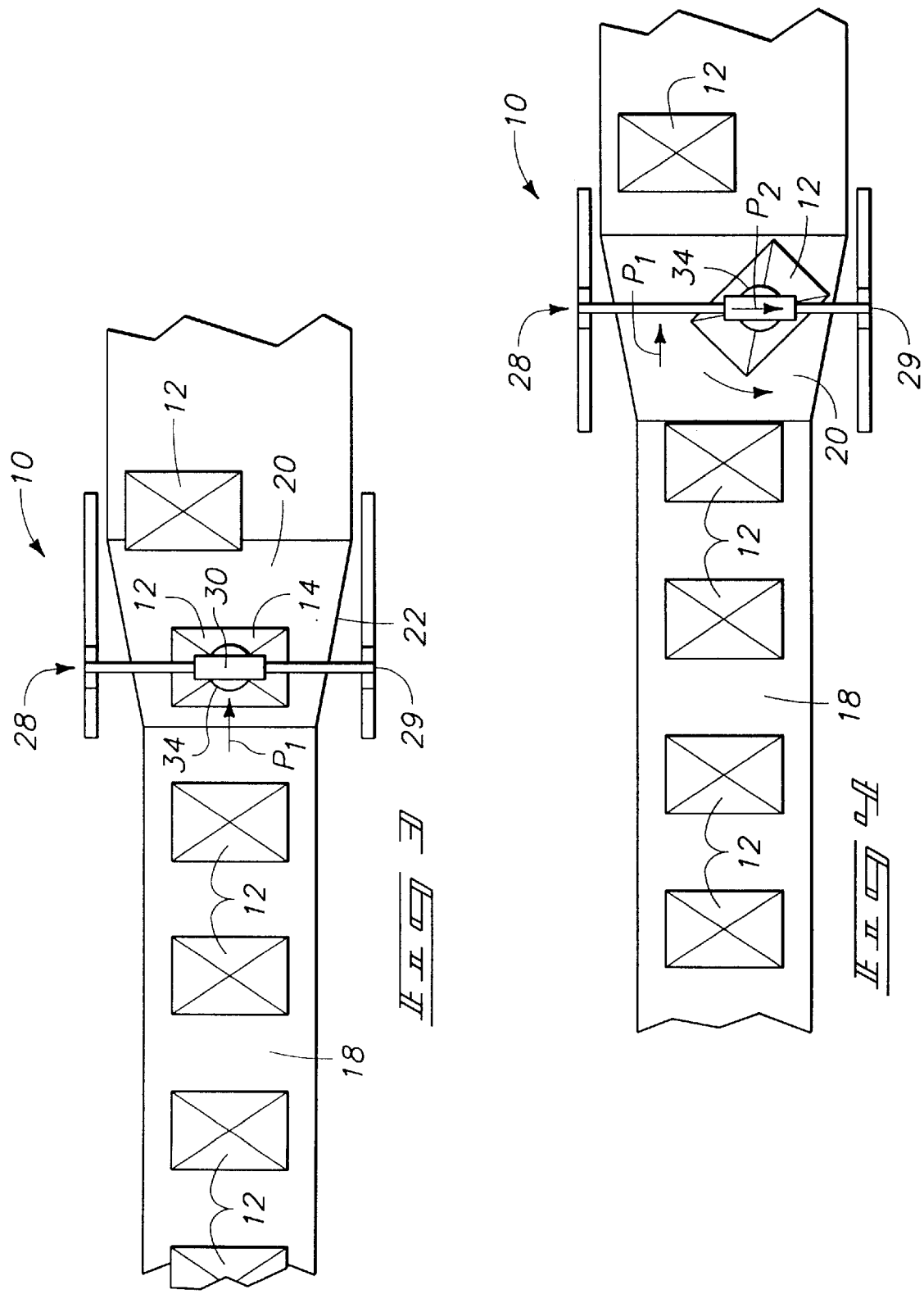

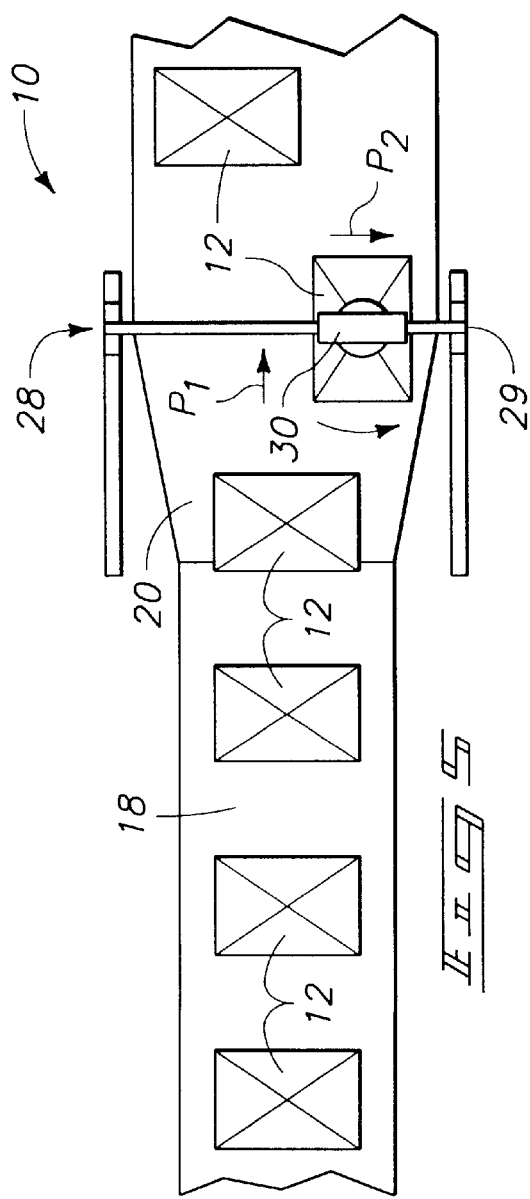
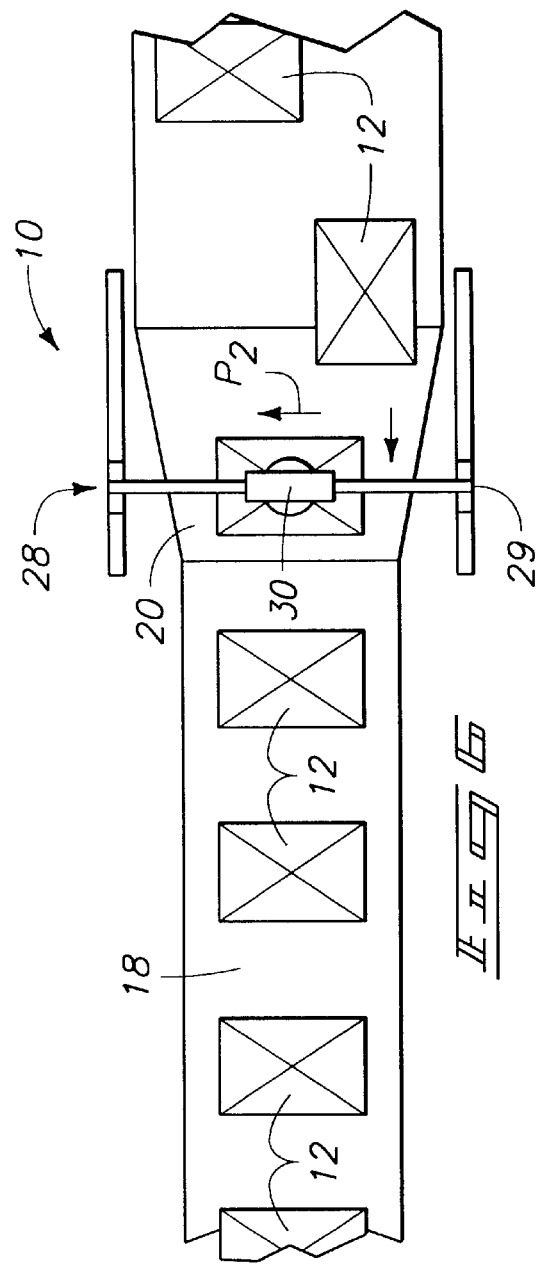

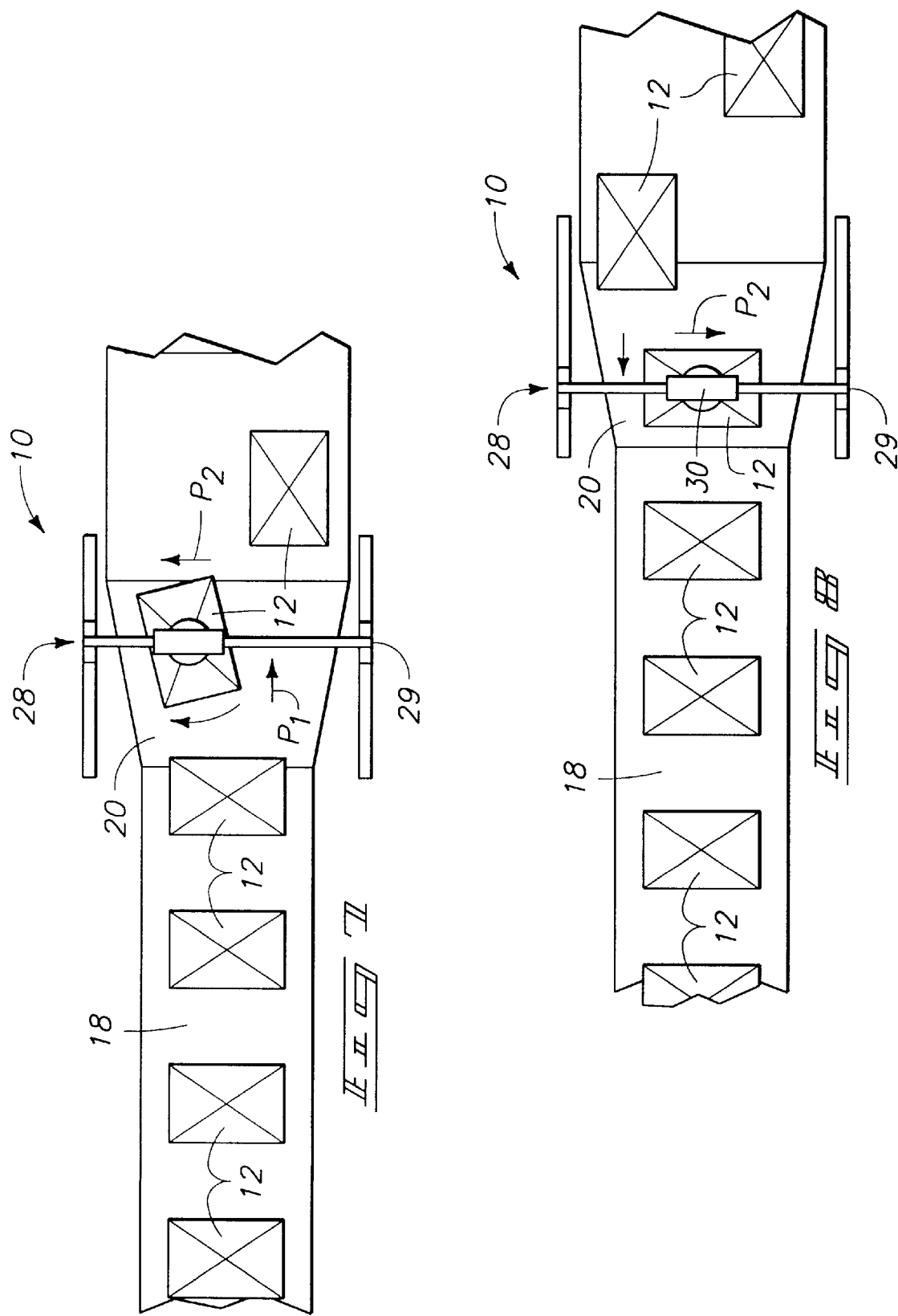

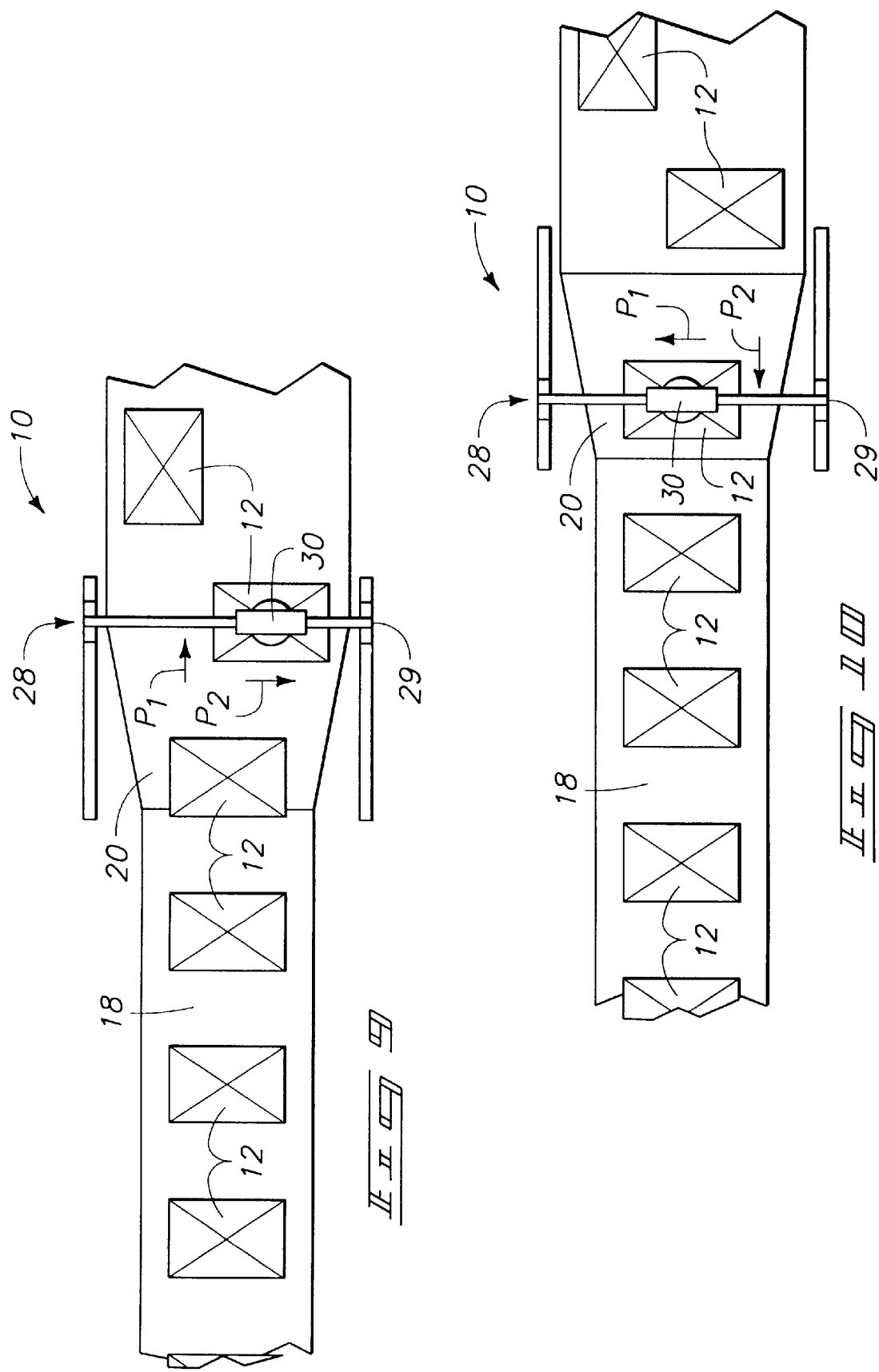

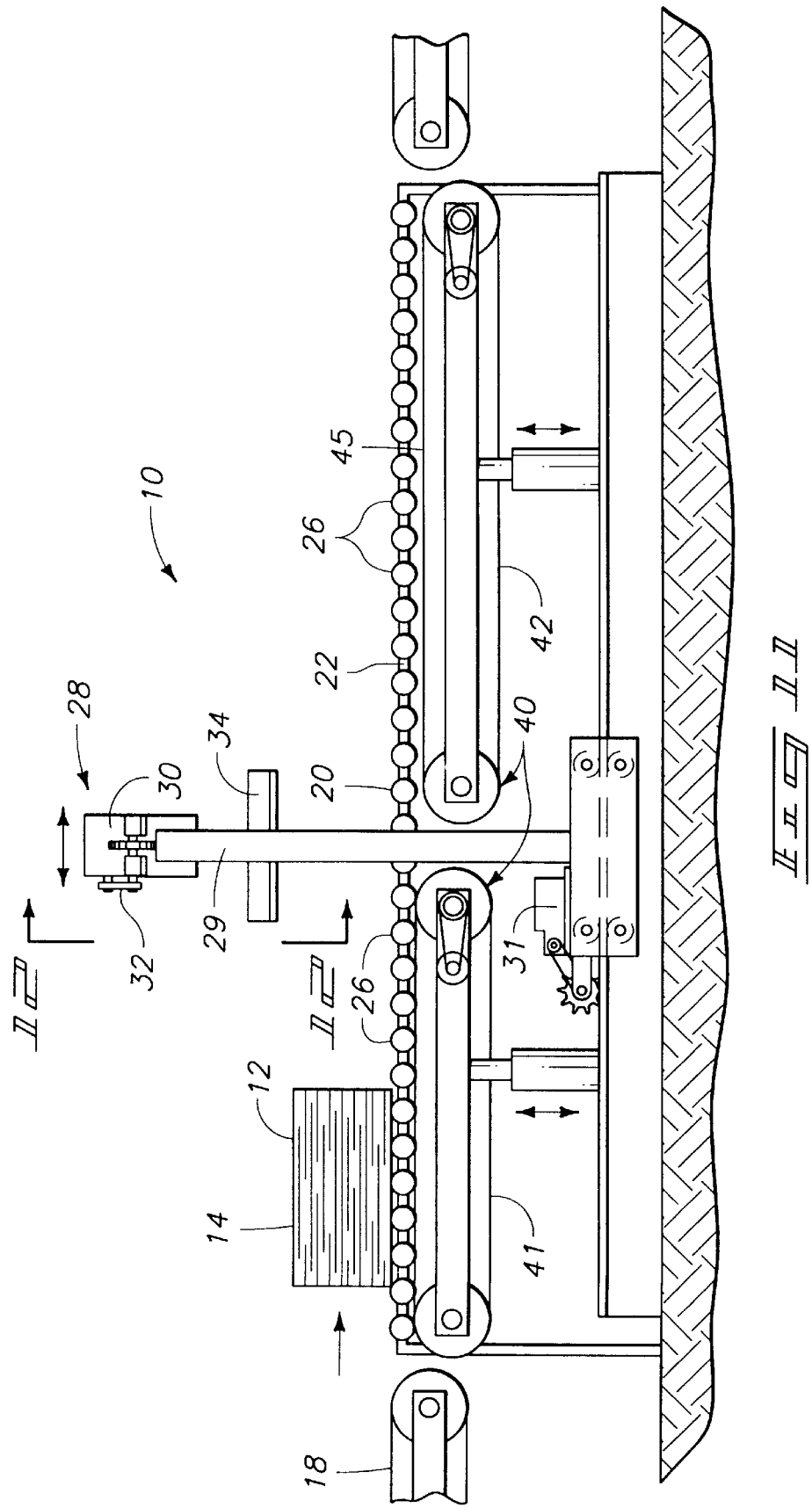

BUNDLE POSITIONING DEVICE

TECHNICAL FIELD

The present invention relates to moving a bundle from a first path at a selected feed rate then simultaneously shifting and selectively rotating the bundle while moving at the selected feed rate to a different orientation and a different path.

BACKGROUND OF THE INVENTION

Many different approaches have been used to accomplish re orientation of bundles of materials being fed at a selected feed rate along a single path. The process typically involved includes temporarily stopping the forward progress of the bundle feed while successive bundles are engaged, lifted, turned, then moved to a selected position before being allowed to progress on to an ultimate position.

The above process is common in the corrugated board industry where loose stacks of box blanks (bundles) are moved in a row along a feed conveyor. It is typical that the bundles are moved single file along a conveyor to a station where the successive bundles are stopped before being shifted to a new orientation. A simple path change for the bundles is relatively easily accomplished. It is where the bundles are to be rotated to a new angular position that difficulty is experienced.

Bundle rotation has typically been accomplished by engaging and rotating the bundle with a rotation apparatus. Rotation is usually accomplished by engaging opposite sides of the bundle between clamping devices, then rotating the devices and clamped bundle to a selected orientation.

Common rotation devices clamp the bundle at top and bottom surfaces. The bottom clamp member is usually designed to lift the bundle off the conveying surface, as exemplified in U.S. Pat. Re. No. 35,066 to Martin (granted Oct. 17, 1995). Forward progress of the successive bundles must be stopped while this operation takes place. This has the effect of slowing progress of the bundles to their ultimate destinations.

The present invention eliminates the need for stopping progress of the bundles to accomplish repositioning and rotation of the successive bundles by engaging selected bundles as they move along, while simultaneously shifting bundle position and rotating the bundle without slowing forward bundle progress. Thus the feed rate of the bundles need not be slowed or interrupted.

BRIEF DESCRIPTION OF THE DRAWINGS

Preferred embodiments of the invention are described below with reference to the following accompanying drawings.

FIGS. 1–10 are a series of schematic views exemplifying progress of a number of bundles and the steps accomplished for re-positioning the bundles as they move along;

FIG. 11 is a side elevation view of an exemplary positioning apparatus; and

FIG. 12 is an enlarged fragmented view of a carriage assembly.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In general terms, the present invention relates to a process and device by which successive bundles moving along at a prescribed feed rate are shifted and rotated to a new position at the same feed rate.

More specifically, a preferred example of the present device is illustrated in the drawings (FIGS. 11 and 12) and is generally indicated therein by the reference numeral 10. The device 10 is used for positioning a bundle 12 having a top surface 14 and a bottom surface 16.

The "bundle" may include a variety of forms, but in the example illustrated herein, is comprised of a stack of partially formed corrugated boxes. Other "bundles" that may be effectively utilized by the present method and apparatus might be comprised of other materials and take configurations other than those shown. For example, the bundles could be formed boxes (not shown) with or without contents, and having closed top and bottom surfaces. The term "bundle" should therefor be viewed in broad context and not limited to the specific examples illustrated herein.

In the example illustrated, a series of bundles 12 are delivered along a prescribed infeed path at a prescribed feed rate. It is common that the bundles 12 be delivered along the infeed path in a substantially horizontal plane by a conventional driven infeed conveyor system 18. The prescribed feed rate is that rate at which a single bundle is moved through a prescribed distance along the infeed path in a prescribed amount of time. For purposes of later description, an exemplary prescribed feed rate will be given as 3 feet per second. Of course, other rates may be selected.

Preferred forms of the present device include a low friction surface 20 positioned to support successive bundles 12 along the bottom surfaces 16 thereof for free movement in a prescribed plane (preferably approximately horizontal). The preferred low friction surface 20 includes a table 22 with a top surface 24 for receiving and movably supporting bundles for movement in a horizontal plane (preferably the same plane as the infeed conveyor 18). In a preferred form, the low friction surface 20 includes conventional multi-directional rollers 26 which define the top surface 24. The rollers 26 support received bundles along their bottom surfaces for relatively free movement in the horizontal plane.

A carriage assembly 28 is situated adjacent the low friction surface 20. The carriage assembly 28 includes primary and secondary frames 29, 30 respectively that are arranged in a gantry configuration to span the low friction surface 20. The primary frame 29 is movable in a first elongated path P1 along the low friction surface 20 in a longitudinal linear direction in line with the infeed path of the successive bundles delivered by the infeed conveyor. The secondary frame 30 is movable on the primary frame and thus will move with the primary frame along the first path P1 but will also move in a lateral side-to-side linear direction along a second path P2.

The primary and secondary frames 29, 30 are driven by respective conventional first and second drivers 31, 32. The first driver 31 serves to selectively move the primary frame forward and back along the table, and the second driver 32 selectively moves the secondary frame laterally on the primary frame 29. Combined operation of the drivers facilitates movement of the secondary 30 frame to numerous selected position over the low friction surface 20.

The first driver 31 is connected to the primary frame 28 for moving the primary frame in a said first path P1 of movement in an operational downstream stroke and a return upstream stroke. The operational stroke is performed at approximately said prescribed feed rate, for example 3 feet per second.

The second driver 32 is connected between the primary frame and the secondary frame to move the secondary frame a bundle engaging foot 34 in said second path P2 of movement at said prescribed feed rate.

The bundle engaging foot 34 is considered a part of the carriage assembly 28 and is preferably mounted to the secondary frame 30. The bundle engaging foot 34 is configured for selective movement along an axis X that is substantially normal to the low friction surface 20. A ram cylinder or linear actuator 33 mounts the foot 34 to the secondary frame 30 to move the foot substantially elevationally to selectively engage and release the top surface 14 of the bundle 12.

The foot 34 may be moved to press the bundle against the low friction surface 20. A high friction surface such as a rubber pad may be provided on the bottom surface of the foot 34 to assure that the foot 34 will not move relative to an engaged bundle.

The carriage assembly 28 and bundle engaging foot 34 are configured to selectively rotate the bundle on the axis X with the bottom bundle surface 16 along the plane of the low friction surface 20. For this purpose, a rotator 36 (FIG. 12) mounts the bundle engaging foot 34 to the secondary frame for selective rotation about the axis X. The bundle engaging foot 34 is thus selectively rotatable on the axis X to rotate an engaged bundle 12 on the low friction surface about the axis X irrespective of movement of the bundle engaging foot along either of the first and second paths.

FIG. 11 also diagrammatically illustrates an under table drive 40 that is positioned below the low friction surface 20. In preferred forms, the under table drive includes two independently operable and vertically movable conveyors 41, 42. The conveyors include working surface 44, 45 that are selectively and individually movable elevationally from an inoperative position below the table to an operative position in which the associated working surface 41 or 42 is engaged with the rollers 26 of the low friction surface, to change the rollers from a free-wheeling state to a driven state. In FIG. 11, under table conveyor 41 is shown in the operative position engaging the rollers and under table conveyor 42 is shown in the inoperative position clear of the rollers 26.

The under table drive is selectively operable to move the bundle on the low friction surface. This may be accomplished in appropriately timed sequence with operation of the carriage assembly as will be better understood below.

Operation of the above described device may be understood in terms of the presently preferred bundle positioning process.

In general terms, the present method involves the steps of
(1) moving the bundle at a prescribed feed rate along an infeed path;
(2) selectively engaging the bundle as the bundle moves along the infeed path and moving the bundle at the prescribed feed rate to a discharge path different from the infeed path; and
(3) selectively simultaneously rotating the bundle about an axis as the bundle is moved at the selected feed rate from the infeed path to the discharge path.

More specifically, the first step includes moving the bundle 12 at a selected feed rate along a infeed path by the infeed conveyor system 18 which, for example, may be set to deliver a row of bundles at a feed rate of 3 feet per second. Successive bundles are delivered in a prescribed spaced relation using upstream equipment that is not part of the present invention. The bundles are delivered along the infeed path as indicated in FIGS. 1–9 in a substantially horizontal plane onto the low friction surface 20, which is also situated in the same horizontal plane. The under table conveyor 40 is raised at this point to engage the underside of the rollers 26 of the low friction surface 20 to change the rollers 26 from the free-wheeling mode to a driven mode. The rollers are now used to continue moving the bundle at the same feed rate from the feed conveyor and toward the first position at which the carriage assembly operates to engage and further move the bundle.

The next step involves engaging the bundle as the bundle moves along the infeed path (FIG. 1), then moving the bundle at the selected feed rate (3 feet per second) to a discharge path that is different from the infeed path (FIG. 2). This step is accomplished in a preferred process by retraction of the under table conveyor 40 and operation of the carriage assembly 28 to move the bundle over the low friction surface (over the presently free-wheeling rollers 26).

Appropriate controls, including an appropriate vision system or other conventional control systems may be used for locating and determining orientation of the bundle, and initiating operation of the carriage assembly 28 and under table conveyors in a specified, preprogrammed manner.

It is pointed out, especially with reference to FIGS. 1 and 2, that the bundle need not be rotated while moving between the first and second positions. Rotation of the bundle is an elective that may be programmed to achieve various bundle orientations. In fact, FIGS. 1 and 2 show the engaged bundle being moved substantially translationally without rotation from its beginning first position orientation on the low friction surface to the second laterally offset position.

It is also noted that the carriage assembly is moving along with the bundle at the first position when the foot is lowered into engagement with the top surface of the bundle. Thus forward progress of the bundle need not be stopped. Instead, the foot is lowered to come into contact with the bundle at the first bundle position (FIG. 1) while the bundle and carriage assembly (including the foot) are moved forwardly. The under table conveyor 42 is lowered to the inoperative position upon engagement of the bundle by the foot, thus allowing the carriage assembly to move the bundle over the low friction surface. Thus there is no problem presented in overcoming inertia of the bundle which would occur if the bundle was at rest (stationary) at the first position. Instead, the foot engages and presses the bundle against the low friction surface "on the fly" so movement of the primary and secondary carriages will carry the already moving, engaged bundle over the low friction surface to whatever second position is desired.

Operation of all drives for the primary and secondary carriages is controlled such that the bundle is moved at the same feed rate from the first position along the infeed path of travel to a second position along a discharge path of travel that is selectively laterally spaced from the infeed path. The under table conveyors 41, 42 are situated in their inoperative, lowered positions at this time to allow free movement of the bundle over the low friction surface.

Once the bundle arrives at the selected second position, the foot is retracted (again while the bundle is moving forwardly) and the under table conveyor 42 is raised to engage the undersides of the rollers 26 immediately above to continue moving the freshly positioned bundle off along its new discharge path of travel for further processing. Also during this time, the under table conveyor 41 is again elevated to engage the rollers 26 above to drive the rollers and assist delivery of the next successive bundle to the first position.

The drives for the carriage assembly are operated immediately upon disengagement of the bundle to return the foot back to the first position for engagement with the next successive bundle which, by reason of the continuous feed rate (3 feet per second) is being delivered by operation of the under table conveyor 41 along the low friction surface toward the first position of the previous bundle.

Once the successive bundle reaches the first position, the carriage and foot are again in place and moving forwardly to engage the bundle top, ready to move the bundle across the low friction surface to the selected second position.

It may be desired to rotate the successive bundle simultaneously with movement of the bundle between the first and a selected second position. This is done simply by activating the bundle rotator 36 to rotate the engaged bundle about the axis X as it is being moved over the low friction surface by the carriage assembly. This step is shown in sequence starting with FIG. 3 where the subsequent bundle is engaged at the first position, then as rotation is commenced while the bundle is moved toward the selected second position (FIG. 4), and finally where the rotation is complete and the bundle has arrived at the selected second position (FIG. 5).

It is noted that the complete rotation occurs while the bundle is moving between the first and second positions, and with the bundle remaining in the horizontal plane of the low friction table. No lifting or elevational adjustment of the bundle is required, nor is it required is that the bundle's forward progress of 3 feet per second be slowed or stopped for the rotation process to occur. The rotator may be activated to rotate the foot back to a starting position while the carriage assembly returns to engage the next successive bundle.

FIGS. 6–9 show a repetition of the process steps with variations of bundle rotation and lateral movement that are all possible through operation of the present device and process. Further all desired movements of the engaged bundles using the present device and process may occur without interrupting flow of the bundles at the selected feed rate from the infeed conveyor. Still further, all desired movements occur with the bundle remaining within the same plane as the infeed conveyor.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A device for positioning a bundle having a top surface and a bottom surface, comprising:
   a low friction surface positioned to support the bundle along the bottom surface for free movement in a prescribed plane;
   a carriage assembly adjacent the low friction surface;
   said carriage assembly including a bundle engaging foot configured for selective movement along an axis substantially normal to the low friction surface to engage the top surface of the bundle and press the bundle against the low friction surface; and
   wherein the carriage assembly and bundle engaging foot are configured to selectively rotate and move the bundle along the plane of the low friction surface.

2. The device of claim 1 wherein the low friction surface includes a table with a substantially flat top surface for receiving and movably supporting the bundle for movement in a horizontal plane.

3. The device of claim 1 wherein the low friction surface is comprised of a table with a multi-directional roller top surface defining a substantially horizontal plane for movably supporting the bundle for movement along said plane.

4. The device of claim 1 wherein the carriage assembly includes primary and secondary frames arranged in a gantry configuration to span the low friction surface, and wherein the primary frame is movable in a first elongated path along the low friction surface in a longitudinal linear direction, and the secondary frame is movable with the primary frame along the first path and in a lateral linear direction; and
   wherein the bundle engaging foot is mounted to the secondary frame.

5. The device of claim 1 wherein the carriage assembly includes primary and secondary frames arranged in a gantry configuration to span the low friction surface, and wherein the primary frame is movable in a first elongated path along the low friction surface in a longitudinal linear direction, and the secondary frame is movable with the primary frame along the first path and in a side-to-side linear direction; wherein the bundle engaging foot is mounted to the secondary frame; and
   further comprising a rotator mounting the bundle engaging foot to the secondary frame for selective rotation about an axis normal to the low friction surface.

6. The device of claim 1 wherein the low friction surface includes a table with a substantially flat top surface for receiving and movably supporting the bundle for movement in a horizontal plane;
   wherein the carriage assembly includes primary and secondary frames arranged in a gantry configuration to span the low friction surface, and wherein the primary frame is movable in a first path along the low friction surface in a forward and rearward linear direction, and the secondary frame is movable with the primary frame along the first path and in a side-to-side linear direction; and
   wherein the bundle engaging foot is mounted to the secondary frame.

7. The device of claim 1 wherein the low friction surface includes a table with a top surface for receiving and movably supporting the bundle for movement in a horizontal plane; and
   an under table drive positioned below the low friction surface and having a working surface that is selectively movable elevationally from an inoperative position below the table and disengaged from the low friction surface to an operative position in which the working surface is engaged with the low friction surface and is selectively operable to move the bundle on the low friction surface.

8. A device for positioning bundles moving along a delivery plane at a prescribed feed rate and in a prescribed direction, comprising:
   a low friction surface positioned to receive bundles;
   a primary frame at least partially spanning the low friction surface;
   said primary frame being selectively movable relative to the low friction surface along a first path of movement in said prescribed direction;
   a secondary frame on the primary frame and movable with the primary frame along the first path of movement and selectively movable with respect to the primary frame along a second path of movement transverse to the first path of movement;

a bundle engaging foot selectively movable along an axis substantially normal to the low friction surface and configured to engage and press a bundle against the low friction surface;

wherein the bundle engaging foot is mounted to the secondary frame to move the bundle on the low friction surface in at least one of the first and second paths of movement in response to corresponding movement of at least one of the primary and secondary frames.

9. The device of claim 8 wherein the bundle engaging foot is selectively rotatable on the axis to rotate an engaged bundle on the low friction surface about the axis irrespective of movement of the bundle engaging foot along either of the first and second paths.

10. The device of claim 8 further comprising a first driver connected to the primary frame for moving the primary frame in a said first path of movement in an operational stroke and a return stroke, and wherein the operational stroke is performed at approximately said prescribed feed rate.

11. The device of claim 8 further comprising:

a first driver connected to the primary frame for moving the primary frame through a operational stroke and a return stroke and wherein the operational stroke is performed at approximately said prescribed feed rate; and a second driver connected between the primary frame and the secondary frame to move the secondary frame and bundle engaging foot in said second path of movement at said prescribed feed rate.

12. The device of claim 8 further comprising:

a first driver connected to the primary frame for moving the primary frame through a operational stroke and a return stroke and wherein the operational stroke is performed at approximately said prescribed feed rate; and a second driver connected between the primary frame and the secondary frame to move the secondary frame and bundle engaging foot in said second path of movement at said prescribed feed rate; and a rotator on the secondary frame operable to selectively rotate the bundle engaging foot and bundle about said axis.

* * * * *